United States Patent
Kobayashi et al.

(10) Patent No.: US 9,202,315 B2
(45) Date of Patent: Dec. 1, 2015

(54) THREE-DIMENSIONAL VIDEO IMAGE PROCESSING DEVICE AND THREE-DIMENSIONAL VIDEO IMAGE PROCESSING METHOD

(71) Applicant: Panasonic Corporation, Osaka (JP)

(72) Inventors: Yuki Kobayashi, Osaka (JP); Yuki Maruyama, Osaka (JP); Kentaro Matsumoto, Osaka (JP); Yasunobu Ogura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 236 days.

(21) Appl. No.: 14/064,688

(22) Filed: Oct. 28, 2013

(65) Prior Publication Data

US 2014/0049544 A1 Feb. 20, 2014

Related U.S. Application Data

(63) Continuation of application No. PCT/JP2012/006635, filed on Oct. 17, 2012.

(30) Foreign Application Priority Data

Jan. 18, 2012 (JP) ................................. 2012-007623

(51) Int. Cl.
*G06T 19/20* (2011.01)
*H04N 13/00* (2006.01)
*H04N 13/02* (2006.01)

(52) U.S. Cl.
CPC ............ *G06T 19/20* (2013.01); *H04N 13/0018* (2013.01); *H04N 13/0022* (2013.01); *H04N 13/0239* (2013.01)

(58) Field of Classification Search
None
See application file for complete search history.

(56) References Cited

U.S. PATENT DOCUMENTS

| 4,667,236 A | 5/1987 | Dresdner |
| 6,195,470 B1 | 2/2001 | Sasaki et al. |

(Continued)

FOREIGN PATENT DOCUMENTS

| JP | 9-116932 | 5/1997 |
| JP | 11-127456 | 5/1999 |
| JP | 2002-281526 | 9/2002 |
| JP | 2006-133665 | 5/2006 |

OTHER PUBLICATIONS

Huttenlocher, Daniel P., and Shimon Ullman. "Object recognition using alignment." Proc. ICCV. vol. 87. 1987.*

(Continued)

*Primary Examiner* — Kee M Tung
*Assistant Examiner* — Xin Sheng
(74) *Attorney, Agent, or Firm* — Wenderoth, Lind & Ponack, L.L.P.

(57) ABSTRACT

A displacement map generation section generates, for a stereoscopic image, a displacement map indicating a displacement of a second viewpoint image relative to a first viewpoint image. A first new image generation section performs rotation processing in accordance with a given rotation angle on the first viewpoint image to generate a new first viewpoint image. A displacement map correction section performs correction processing on the displacement map on the basis of the rotation angle to generate a corrected displacement map. A second new image generation section generates a new second viewpoint image from the new first viewpoint image on the basis of the corrected displacement map.

9 Claims, 11 Drawing Sheets

(56) References Cited

U.S. PATENT DOCUMENTS

| | | | |
|---|---|---|---|
| 2002/0191841 A1* | 12/2002 | Harman | 382/154 |
| 2006/0125917 A1 | 6/2006 | Cha et al. | |
| 2007/0236514 A1* | 10/2007 | Agusanto et al. | 345/646 |
| 2013/0016102 A1* | 1/2013 | Look et al. | 345/426 |
| 2013/0278719 A1* | 10/2013 | Rusert et al. | 348/43 |

OTHER PUBLICATIONS

International Search Report issued in International Application No. PCT/JP2012/006635 on Jan. 8, 2013.

* cited by examiner

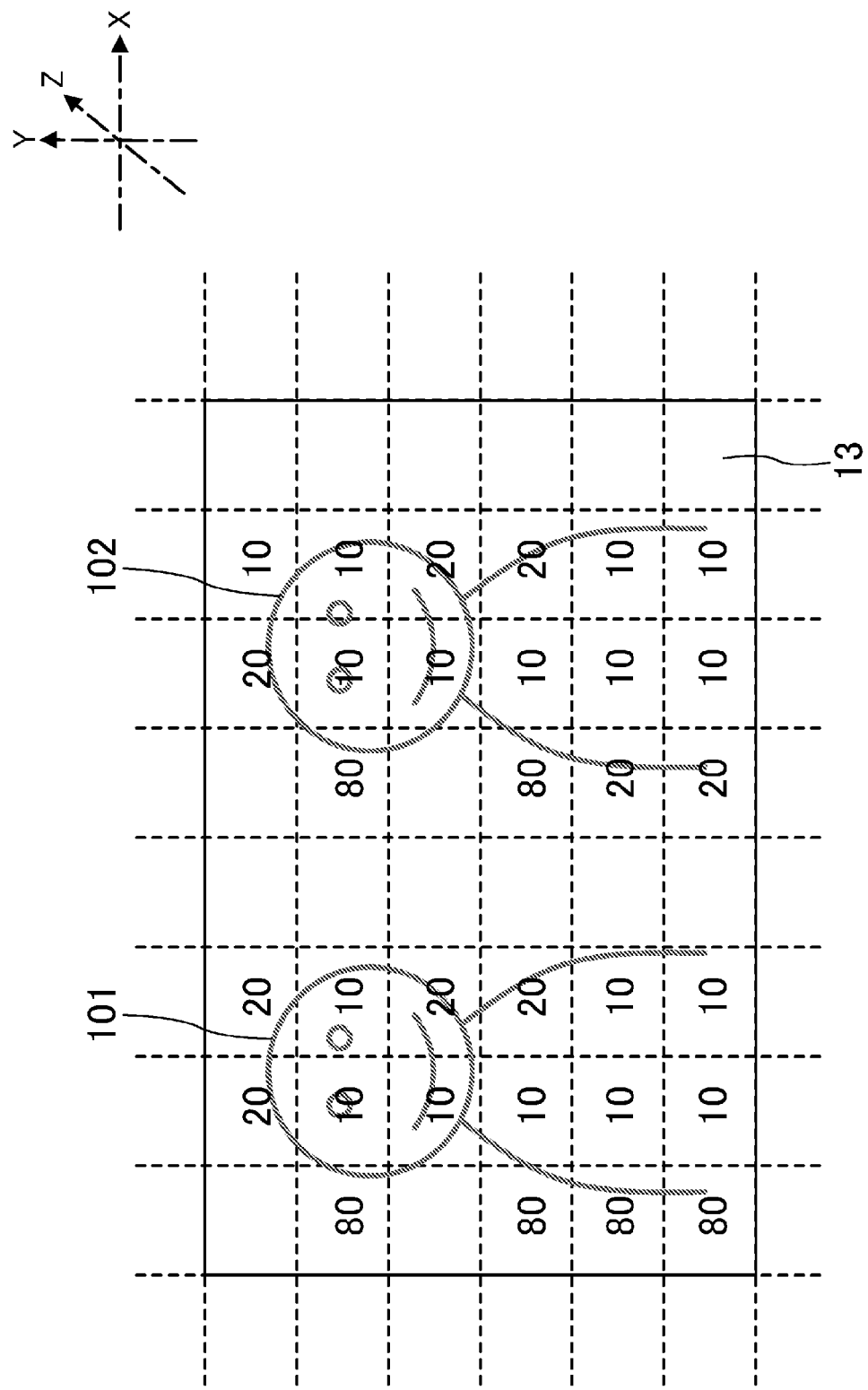

THREE-DIMENSIONAL VIDEO IMAGE PROCESSING DEVICE AND THREE-DIMENSIONAL VIDEO IMAGE PROCESSING METHOD

CROSS-REFERENCE TO RELATED APPLICATION

This is a continuation of PCT International Application PCT/JP2012/006635 filed on Oct. 17, 2012, which claims priority to Japanese Patent Application No. 2012-007623 filed on Jan. 18, 2012. The disclosures of these applications including the specifications, the drawings, and the claims are hereby incorporated by reference in their entirety.

BACKGROUND

The present disclosure relates to a three-dimensional video image processing device that performs rotation processing of a stereoscopic image.

Japanese Patent Publication No. H11-127456 proposes, as known three-dimensional video image processing, edge enhancement processing of further enhancing, in accordance with a binocular parallax, an edge of a subject as the distance to a subject reduces.

The present disclosure provides a three-dimensional image processing device that performs processing of rotating an image about a virtual rotation axis extending in parallel to an image plane on a stereoscopic image in a more natural manner.

SUMMARY

A three-dimensional video image processing device according to an embodiment of the present disclosure includes a displacement map generation section that compares a first viewpoint image and a second viewpoint image of the stereoscopic image with each other to generate a displacement map indicating a displacement of the second viewpoint image relative to the first viewpoint image, a first new image generation section that performs rotation processing of rotating the first viewpoint image about the virtual rotation axis in accordance with a given rotation angle to generate a new first viewpoint image, a displacement map correction section that performs correction processing on the displacement map on the basis of the virtual rotation axis and the rotation angle to generate a corrected displacement map, and a second new image generation section that generates a new second viewpoint image from the new first viewpoint image on the basis of the corrected displacement map.

According to the present disclosure, when rotation processing is performed on a stereoscopic image, the stereoscopic image can be transformed into a stereoscopic image with a more natural stereoscopic effect.

BRIEF DESCRIPTION OF THE DRAWINGS

FIG. 3 is a view illustrating an example of an image and a displacement map corresponding to the image.

DETAILED DESCRIPTION

As a method for rotating an image, there is a method in which an image plane is rotated about a virtual rotation axis which is in parallel to the image plane and extends, for example, in a substantially perpendicular direction to display an image. Such a display method is also referred to as a "perspective transformation." However, for a stereoscopic image, if only known perspective transformation processing that has been used for processing a two-dimensional image is performed on the stereoscopic image, a proper stereoscopic image cannot be reliably obtained.

Embodiments will be described in detail below with reference to the attached drawings. However, unnecessarily detailed description might be omitted. For example, detail description of well-known techniques or description of the substantially same elements might be omitted. Such omission is intended to prevent the following description from being unnecessarily redundant and to help those skilled in the art easily understand it.

Note that the present inventors provide the following description and the attached drawings to enable those skilled in the art to fully understand the present disclosure. Thus, the description and the drawings are not intended to limit the scope of the subject matter defined in the claims.

Embodiment 1

1-1. Configuration

Figure 1:
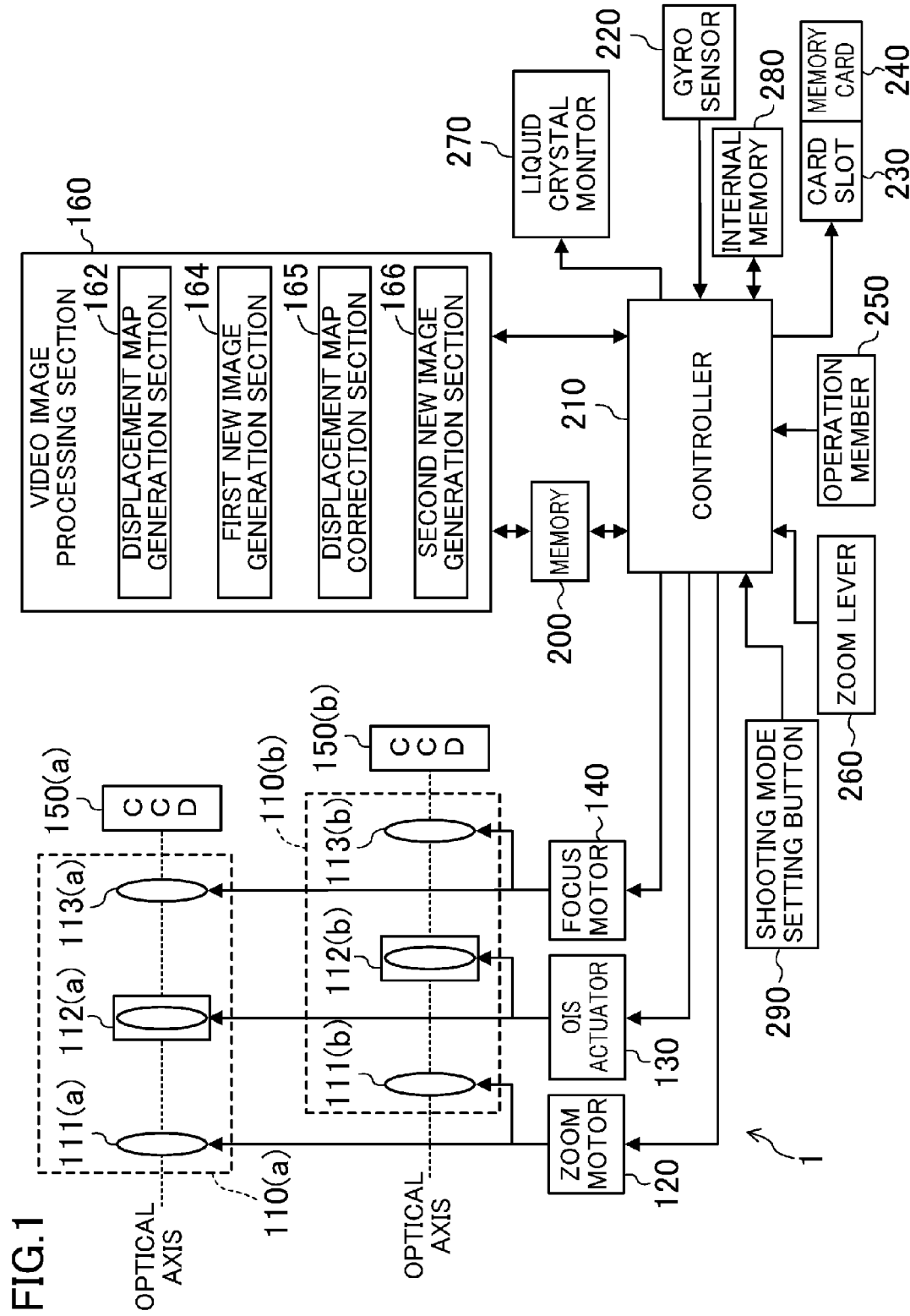
FIG. 1 is a diagram illustrating a functional configuration of a three-dimensional video image processing device according to an embodiment.

FIG. 1 is a diagram illustrating a configuration of a digital camera as an example of a three-dimensional video image processing device according to this embodiment. The digital camera 1 illustrated in FIG. 1 includes optical systems 110(a) and 110(b), a zoom motor 120, an optical image stabilization (OIS) actuator 130, a focus motor 140, CCD image sensors 150(a) and 150(b), an video image processing section 160, a memory 200, a controller 210, a gyro sensor 220, a card slot 230, a memory card 240, an operation member 250, a zoom lever 260, a liquid crystal monitor 270, an internal memory 280, and a shooting mode setting button 290.

The optical system 110(a) includes a zoom lens 111(a), an OIS 112(a), and a focus lens 113(a). The optical system 110(b) includes a zoom lens 111(b), an OIS 112(b), and a focus lens 113(b). Note that the optical system 110(a) forms a subject image at a first viewpoint. The optical system 110(b) forms a subject image at a second viewpoint which is different from the first viewpoint.

The zoom lenses 111(a) and 111(b) can enlarge or reduce a subject image by moving along the optical axis of the corresponding optical system. The zoom lenses 111(a) and 111(b) are controlled by the zoom motor 120.

Each of the OISs 112(a) and 112(b) has therein a correction lens that can move in a plane perpendicular to the optical axis. The OISs 112(a) and 112(b) reduce subject blur by driving the correction lenses in the direction that cancels movement of the digital camera 1. Each of the correction lenses can move by a distance L at most within the corresponding one of the OISs 112(a) and 112(b). The OISs 112(a) and 112(b) are controlled by the OIS actuator 130.

The focus lenses 113(a) and 113(b) adjust the focus of the subject image by moving along the optical axis. The focus lenses 113(a) and 113(b) are controlled by the focus motor 140.

The zoom motor 120 drive-controls the zoom lenses 111(a) and 111(b). The zoom motor 120 may be realized by a pulse motor, a DC motor, a linear motor, a servo motor, or other type of motor. The zoom motor 120 may be configured to drive the zoom lenses 111(a) and 111(b) via a mechanism, such as a cam mechanism, and a ball and screw mechanism, etc. Also, the zoom motor 120 may be configured to control the zoom lenses 111(a) and 111(b) by the same operation.

The OIS actuator 130 drive-controls the correction lenses in the OISs 112(a) and 112(b) in a plane perpendicular to the optical axis. The OIS actuator 130 may be realized by a flat coil, an ultrasonic motor, or the like.

The focus motor 140 drive-controls the focus lenses 113(a) and 113(b). The focus motor 140 may be realized by a pulse motor, a DC motor, a linear motor, a servo motor, or other type of motor. The focus motor 140 may be configured to drive the focus lenses 113(a) and 113(b) via a mechanism, such as a cam mechanism, and a ball and screw mechanism, etc.

The CCD image sensor 150(b) and 150(b) capture the subject images formed by the optical systems 110(a) and 110(b) and generate a first viewpoint image and a second viewpoint image. The CCD image sensors 150(a) and 150(b) perform various types of operations, such as exposure, data transfer, and digital shutter. When being viewed as a pair, the first viewpoint image and the second viewpoint image form a stereoscopic video image.

The video image processing section 160 performs various types of processing on the first viewpoint image and the second viewpoint image generated by the CCD image sensors 150(a) and 150(b). The video image processing section 160 performs processing on the first viewpoint image and the second viewpoint image to generate image data (which will be referred to as a "review image") to be displayed on the liquid crystal monitor 270. Also, the video image processing section 160 generates a video image signal that is to be restored in the memory card 240. For example, the video image processing section 160 performs various types of video image processing, such as gamma correction, white balance correction, and scratch removal, etc., on the first viewpoint image and the second viewpoint image.

The video image processing section 160 performs, for example, enhancement processing, such as edge enhancement processing etc., on the first viewpoint image and the second viewpoint image on the basis of the control signal transmitted from the controller 210.

Furthermore, the video image processing section 160 performs, for each of the processed first viewpoint image and second viewpoint image, compression of a video image signal using a compression method compatible with the JPEG format. Two compressed signals obtained by compressing the first viewpoint image and the second viewpoint image are associated with each other and are recorded in the memory card 240. Note that the two compressed video image signals are preferably recorded using a multipicture format (which will be hereinafter referred to as an "MPF"). When a video image signal that is to be compressed is a moving picture signal, a moving picture compressing method, such as H.264/AVC etc., is used. Also, the MPF and a JPEG image or a MPEG moving image may be recorded simultaneously.

Furthermore, the video image processing section 160 generates a new first viewpoint image and a new second viewpoint image that form a stereoscopic image with a more natural stereoscopic effect from the first viewpoint image and the second viewpoint image generated by the CCD image sensors 150(a) and 150(b) or the first viewpoint image and the second viewpoint image stored in the memory card 240. Specifically, the video image processing section 160 includes a displacement map generation section 162, a first new image generation section 164, a displacement map correction section 165, and a second new image generation section 166 in order to generate the new first viewpoint image and the new second viewpoint image.

The displacement map generation section 162 compares the first viewpoint image and the second viewpoint image with each other and generates a displacement map indicating a displacement of the second viewpoint image relative to the first viewpoint image. On the basis of the displacement indicated in the displacement map, depth information that is a relative positional relationship between subjects projected in the first viewpoint image and the second viewpoint image in an image depth direction is uniquely specified. The generation of the displacement map will be described later.

The first new image generation section 164 performs, on the basis of rotation angle information which will be described later, rotation processing (perspective transformation processing) of rotating an image about a virtual rotation axis on the first viewpoint image to generate the new first viewpoint image. Note that the first viewpoint image may be either one of a right-eye image or a left-eye image.

The displacement map correction section 165 performs processing of correcting the displacement map generated by the displacement map generation section 162 on the basis of perspective transformation processing performed on the first viewpoint image. A specific correction operation of the displacement map correction section 165 will be described later.

On the basis of the corrected displacement map, the second new image generation section 166 generates, from the new first viewpoint image, the new second viewpoint image which makes a pair with the new first viewpoint image to form a stereoscopic image.

The video image processing section 160 may be realized by a DSP, a micron, or the like. Note that a resolution of a review image may be set to be a screen resolution of the liquid crystal monitor 270, and may be set to be a resolution of image data formed by compression using a compression method compatible with the JPEG format.

The memory 200 functions as a work memory of the video image processing section 160 and the controller 210. The memory 200 temporarily stores, for example, a video image signal processed by the video image processing section 160 or image data input from the CCD image sensors 150(a) and 150(b) that have not yet been processed by the video image processing section 160. Also, the memory 200 temporarily stores shooting conditions of the optical systems 110(a) and 110(b) and the CCD image sensors 150(a) and 150(b) at the time of shooting. The shooting conditions include a subject distance, view angle information, an ISO speed, a shutter speed, an EV value, an F value, an inter-lens distance, a shooting time, and an OIS shift amount, etc. The memory 200 may be realized, for example, by a DRM, a ferroelectric memory, or the like.

The controller 210 is a control section that controls the entire apparatus. The controller 210 may be realized by a semiconductor device or the like. The controller 210 may include only a hardware, and alternatively, may be realized by a combination of a hardware and a software. Also, the controller 210 may be realized by a micron or the like.

The gyro sensor 220 includes an oscillator, such as a piezoelectric element etc. The gyro sensor 220 causes the oscillator, such as a piezoelectric element etc., to oscillate at a certain frequency to convert Coriolis force into a voltage and obtains angular speed information. By obtaining the angular information through the gyro sensor 220 and driving the correction lenses in the OIS 112(a) and the OIS 112(b) in the direction in which the oscillation is canceled out, hand shaking applied to the digital camera 1 by a user is corrected. Note that the gyro sensor 220 may be a device that can at least measure angular speed information of a pitch angle. When the gyro sensor 220 can measure angular speed information of a roll angle, rotation movement caused when the digital camera 1 moves substantially in the horizontal direction can be taken into consideration.

The card slot 230 is configured such that the memory card 240 is attachable thereto and removable therefrom. The card slot 230 is mechanically and electrically connectable to the memory card 240.

The memory card 240 includes therein a flash memory, a ferroelectric memory, or the like therein and can store data. That is, the memory card 240 may be a memory device that can store data, and specifically, may be an SD card, a compact flash (registered trademark), an SSD, a hard disk drive, an optical disk, or the like.

The operation member 250 includes a release button. The release button receives a press operation made by the user. When the release button is pressed halfway down, AF control and AE control is started via the controller 210. When the release button is pressed down all the way down, shooting of a subject is performed.

The operation member 250 is a member that receives rotation angle information indicating rotation statuses of the first viewpoint image and the second viewpoint image from the user. How much the first viewpoint image and the second viewpoint image are to be rotated when the first viewpoint image and the second viewpoint image are displayed is determined on the basis of the rotation angle information. For example, the operation member 250 receives from the user the rotation angle information indicating 90-degree rotation, and outputs the rotation angle information to the controller 210. The controller 210 outputs a control signal to the video image processing section 160 on the basis of the received rotation angle information. When the video image processing section 160 receives the control signal of 90-degree rotation from the controller 210, the video image processing section 160 rotates the first viewpoint image and the second viewpoint image by 90 degrees.

The zoom lever 260 is a member that receives an instruction of changing a zoom magnification from the user.

The liquid crystal monitor 270 is a display device that can two-dimensionally or three-dimensionally display the first viewpoint image and the second viewpoint image generated in the CCD image sensors 150(a) and 150(b) and the first viewpoint image and the second viewpoint image read out from the memory card 240. The liquid crystal monitor 270 can display various types of setting information of the digital camera 1. For example, the liquid crystal monitor 270 can display an EV value, an F value, a shutter speed, and an ISO speed, etc., which are shooting conditions at the time of shooting.

When the liquid crystal monitor 270 performs two-dimensional display, the liquid crystal monitor 270 may select one of the first viewpoint image and the second viewpoint image and display the selected one, and alternatively, may divide a screen and display the first viewpoint image and the second viewpoint image such that they are arranged in the divided left and right portions or the divided up and down portions. As another option, the first viewpoint image and the second viewpoint image may be displayed alternately for each line.

When the liquid crystal monitor 270 performs three-dimensional display, the liquid crystal monitor 270 may display the first viewpoint image and the second viewpoint image in a frame sequential manner. Alternatively, the liquid crystal monitor 270 may include a lenticular lens or a parallax barrier and be configured to display the first viewpoint image and the second viewpoint image so that they look as a stereoscopic video image to the naked eye.

The internal memory 280 includes a flash memory, a ferroelectric memory, or the like. The internal memory 280 stores a control program etc. used for control the entire digital camera 1.

The shooting mode setting button 290 is a button used for setting a shooting mode at the time of performing shooting by the digital camera 1. The shooting mode indicates a shooting scene that the user assumes, and options for the shooting mode may be, for example, two-dimensional shooting modes including (1) a person mode, (2) a child mode, (3) a pet mode, (4) a macro mode, and (5) a scenery mode, and (6) a three-dimensional shooting mode. Note that the digital camera 1 may have a three-dimensional mode for each of the modes (1) to (5). The digital camera 1 sets a suitable shooting parameter on the basis of the shooting mode, and performs shooting. Note that the digital camera 1 may be configured to have a camera automatic setting mode in which the digital camera 1 performs automatic setting. The shooting mode setting button 290 is a button used for setting a playback mode for a video image signal recorded in the memory card 240.

1-2. Detailed Operation of Video Image Processing Section 160

The detailed operation of the video image processing section 160 will be hereinafter described with reference to the attached drawings.

1-2-1. Generation of Displacement Map

Figure 2A:
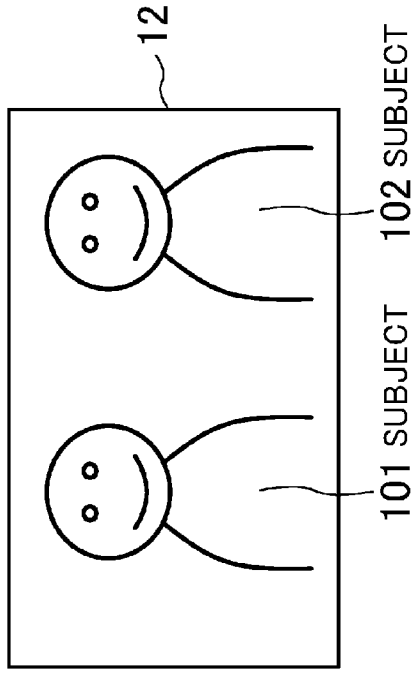
FIGS. 2A-2C are views illustrating the generation of a displacement map.
Figure 2B:
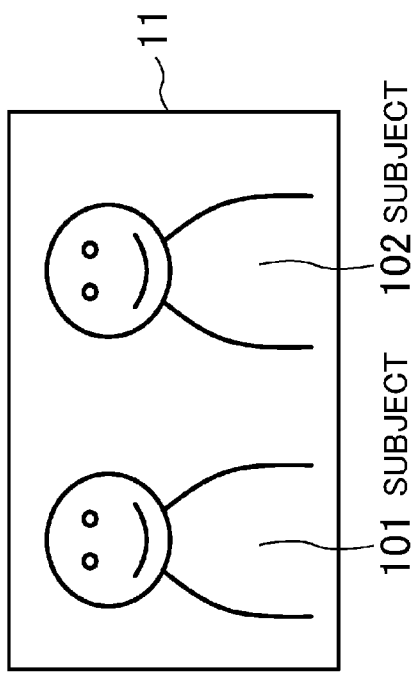

First, the generation of a displacement map will be described. FIG. 2A illustrates an example of the first viewpoint image 11, and FIG. 2B illustrates an example of the second viewpoint image 12. Each of the first viewpoint image 11 and the second viewpoint image 12 includes subjects 101 and 102.

Figure 2C:
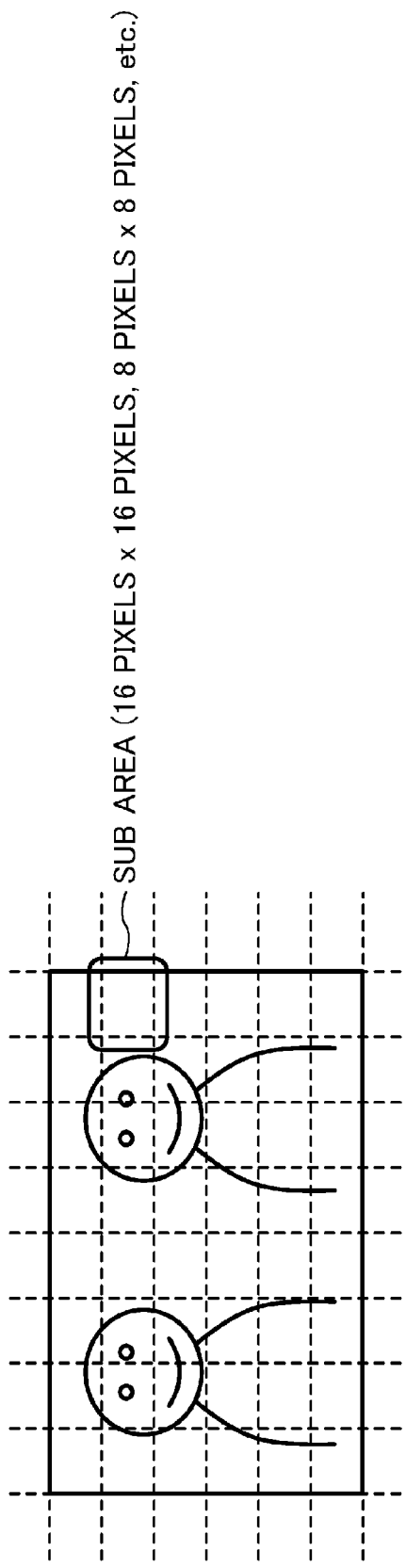

As illustrated in FIG. 2C, the displacement map generation section 162 divides the first viewpoint image 11 read out, for example, from the memory 200 into a plurality of sub areas and detects a parallax (a displacement amount) using the sub area as a unit. The number of sub areas may be set on the basis of the throughput of the entire digital camera 1. For example, when the processing load of the digital camera 1 is taken into consideration, control is performed such that the setting number of the sub areas is increased, if the digital camera 1 has a large enough throughput. On the other hand, if the digital camera 1 does not have a large enough throughput, control is performed such that the setting number of the sub areas is reduced. Specifically, the digital camera 1 may be configured to detect, if the digital camera 1 has a large enough throughput, a parallax in a unit of pixel, and alternatively, may be configured to set, if the digital camera 1 does not have a large enough throughput, a 16×16 pixel unit as a sub area and detect a single representative parallax in the sub area.

Note that the parallax is, for example, a displacement amount of the second viewpoint image 12 relative to the first viewpoint image 11 in the horizontal direction. In this case, the displacement map generation section 162 performs block matching processing for a sub area in the first viewpoint image 11 and the second viewpoint image 12. The displacement map generation section 162 calculates the displacement amount in the horizontal direction and sets the parallax on the basis of a result of the block matching processing.

FIG. 3 is a view illustrating an example displacement map corresponding to the first viewpoint image 11. In a displacement map 13 of FIG. 3, a displacement amount between the first viewpoint image 11 and the second viewpoint image 12 in the horizontal direction is represented by a pixel value. Assuming that as the distance in depth of the position of a subject increases, the value of the displacement amount increases, the maximum displacement amount is set to be 100. Note that, to simplify illustration, the displacement amount is not written for a block in which the displacement amount is 100 (maximum). Also, the X axis is set to extend in the horizontal direction of the image plane, the Y axis is set to extend in the vertical direction of the image plane, and the Z axis is set to extend in the depth direction from the near side of the image plane to the distant side thereof. In the example of FIG. 3, the subjects 101 and 102 chiefly have the same displacement amount, i.e., 10, and the background has a displacement amount of 100. Also, in a block including the subjects 101 and 102 and the background together, an intermediate value of the displacement amounts of the subjects 101 and 102 and the background is set on the basis of the sizes of parts in the block occupied by the subjects 101 and 102 and the background, or the like.

Note that the value for the depth of a subject or the like is not limited to the description above. Also, a method for digitalizing the depth differs depending on a shooting method. For example, in shooting of a stereoscopic image, when a parallel view method is used, a subject located nearer has a greater displacement amount. When a cross-eyed view method is used, on the other hand, the displacement amount differs depending on a correlation with the intersection point of viewpoint directions of the left and right eyes. The direction of displacement in a position nearer than the intersection point is opposite to the direction of displacement in a position more distant than the intersection point. In this embodiment, the case where a stereoscopic image obtained by shooting using the cross-eyed view method is described, but the present disclosure is not limited thereto.

Thus, the value indicating the relative positional relationship between subjects in the image depth direction can be obtained. In this case, an area in which the displacement amount is large is located more distantly in depth than an area in which the displacement amount is small is located.

Note that, in the description above, the displacement amount in the horizontal direction is merely represented by the pixel value of an image, but it may be represented by a value other than the pixel value. For example, the displacement amount in the horizontal direction may be represented by a ratio of the pixel value of displacement in the horizontal direction relative to the horizontal size of the image. For example, when the horizontal size of an image is 1920 pixels and the image is displaced by 40 pixels in the horizontal direction, the displacement amount in the horizontal direction is 2%.

Note that, when the video image processing section 160 rotates (perspective-transforms) the first viewpoint image, a displacement map corresponding to the first viewpoint image is preferably obtained. Herein, the displacement map corresponding to the first viewpoint image is information indicating the parallax of each subject included in the first viewpoint image. There is also a displacement map corresponding to the second viewpoint image. A reason why there are two displacement maps is that occlusion occurs in each of the first viewpoint image and the second viewpoint image. The occlusion occurs when the shooting position of the first viewpoint image is different from the shooting position of the second viewpoint image. Also, the occlusion occurs because of difference in appearance (for example, a trapezoidal distortion) between the subjects due to a displacement of the optical axis.

1-2-2. Generation of New First Viewpoint Image

Figure 4:
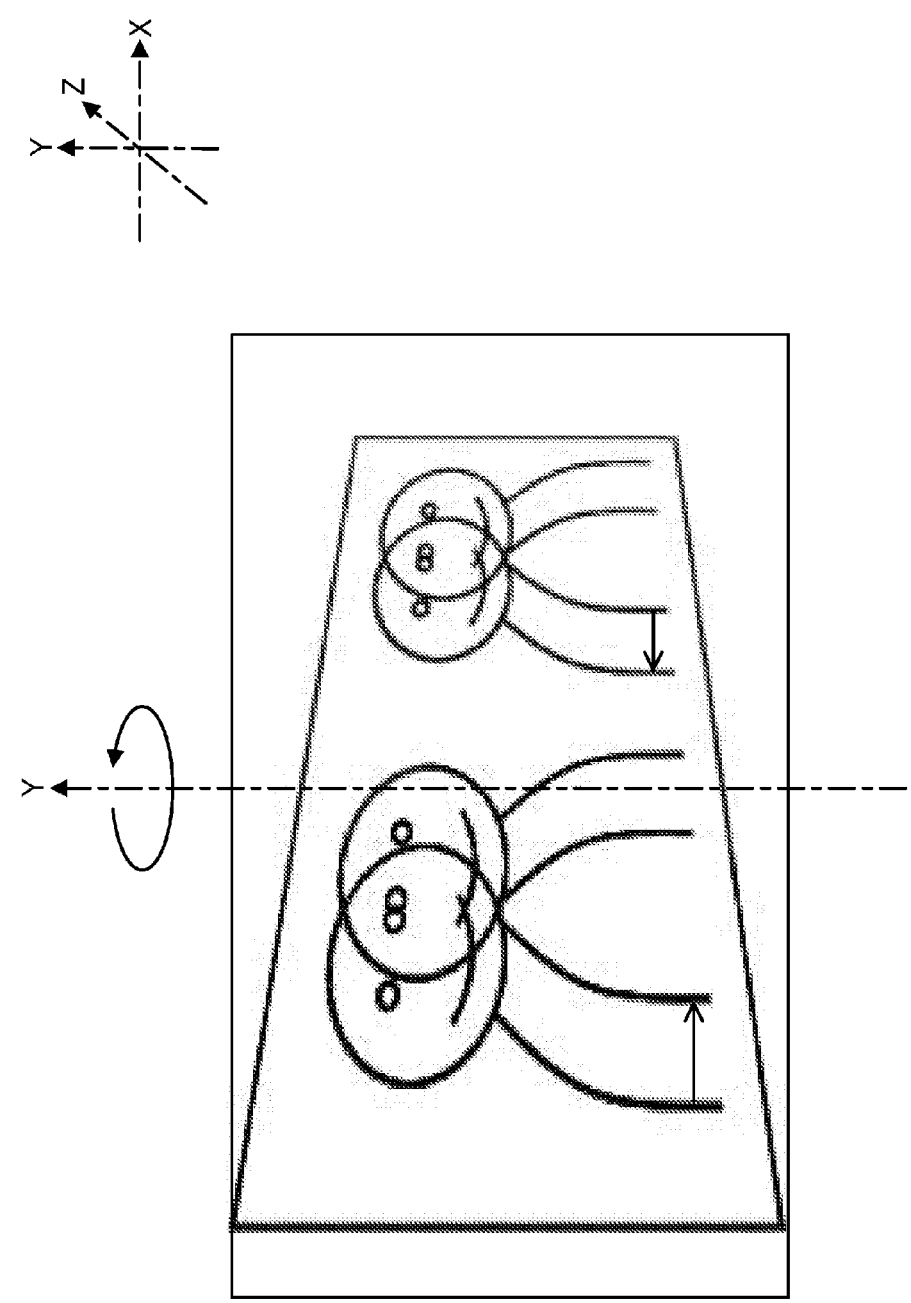
FIG. 4 is a view illustrating an example of image rotation processing (perspective transformation processing).

The rotation (perspective transformation) processing described in the present disclosure is, as illustrated in FIG. 4, the processing of rotating an image about the Y axis serving as a virtual rotation axis. In this rotation processing, coordinate moving processing and enlargement and reduction processing are performed on a planar image, thereby causing the image to look as if it were rotated in a three-dimensional space. In the example of FIG. 4, by rotation processing, a part located at the left side of the Y axis is displayed so as to look located relatively near, and a part located at the right side of the Y axis is displayed so as to look located relatively distant. In this case, for example, similar to the case where the image is displayed in perspective, the part at the right side is displayed such that the sizes thereof in the horizontal direction (the X direction) and the vertical direction (the Y direction) are reduced, as the distance thereof from a viewer increases. In the present disclosure, the above-described rotation processing is described by referring to as perspective transformation processing.

The first new image generation section 164 performs perspective transformation processing on the first viewpoint image with the Y axis centered in accordance with given rotation angle information to generate a new first viewpoint image. The perspective transformation processing herein may be performed in a similar manner to that in perspective transformation processing which has been performed on a normal image (a two-dimensional image). In this disclosure, there is no intention to limit the known perspective transformation processing.

1-2-3. Correction of Displacement Map

The displacement map correction section 165 performs perspective transformation processing suitable for a stereoscopic image for a displacement map generated by the displacement map generation section 162 using the first viewpoint image 11 as a reference.

Figure 5:
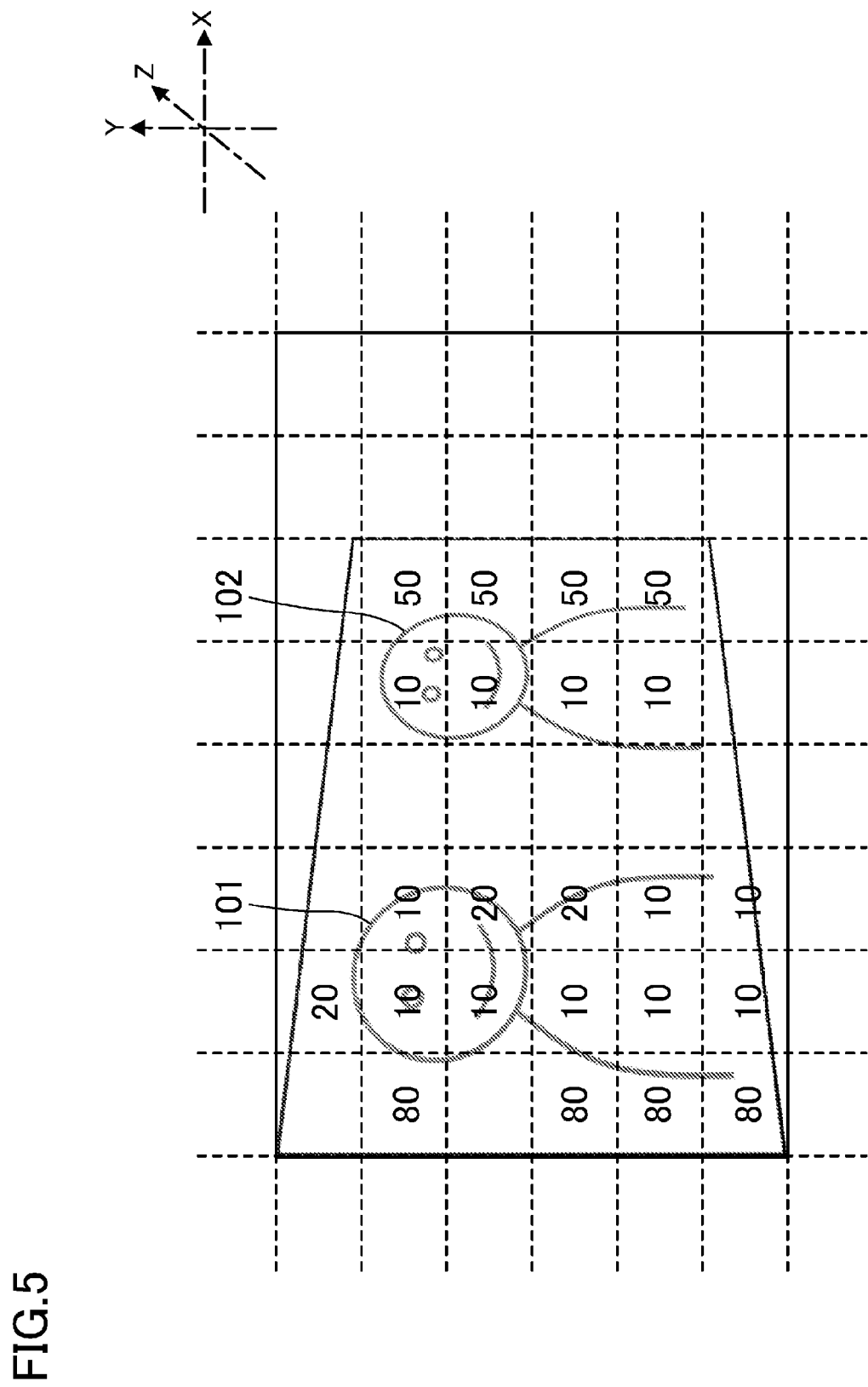
FIG. 5 is a view illustrating an example where the same processing as image rotation processing is performed on a displacement map.

In this case, when known perspective transformation processing is merely performed on the displacement map, a stereoscopic image cannot be disadvantageously expressed in a correct manner. FIG. 5 is a view illustrating an example where the same processing as perspective transformation processing performed by the video image processing section 160 on the first viewpoint image is performed on the displacement map illustrated in FIG. 3. In this case, the numerical value in each block of FIG. 5 represents the displacement amount after transformation.

As illustrated in FIG. 5, for the displacement amount, coordinate moving processing similar to that performed on the first viewpoint image is performed, and thus, the displacement amount in each block varies in accordance with the coordinate moving. However, the displacement amounts for the subjects 101 and 102 themselves are not changed, and are both 10.

Figure 6A:
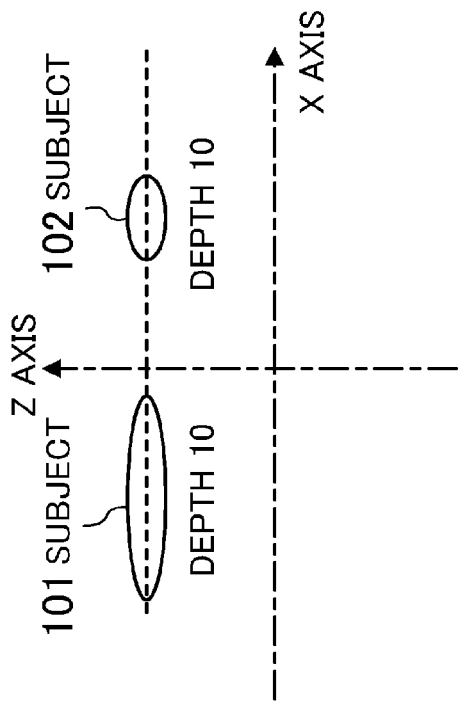
FIGS. 6A and 6B are views each illustrating a depth relationship in the displacement map of FIG. 5.
Figure 6B:
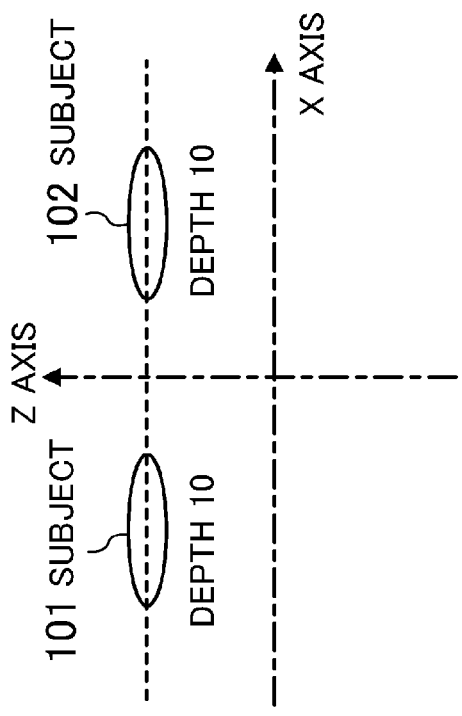

FIGS. 6A and 6B are views each illustrating the positional relationship of subjects presented in the displacement map. FIG. 6A illustrates a state before perspective transformation processing is performed, and FIG. 6B illustrates a state after perspective transformation processing is performed. As illustrated in FIG. 6A, before perspective transformation processing is performed, the subjects 101 and 102 have the same depth, i.e., 10. On the other hand, as illustrated in FIG. 6B, a subject 101 is relatively enlarged and a subject 102 is relatively reduced by the perspective transformation processing, but the depth value for each of the subject 101 and 102 remains 10. That is, the enlarged subject 101 and the reduced subject 102 have the same depth value, and this is contradictory to the illustration of FIG. 4 in which the subject 101 on the left side is disposed in the near side and the subject 102 on the right side is disposed in the distant side in an actual image due to perspective transformation processing.

This shows that, when the same processing as perspective transformation processing that is performed on the first viewpoint image is merely performed on the displacement map, the depth is not normally indicated in a stereoscopic image after image processing. That is, in order to correctly perform perspective transformation processing on a stereoscopic image, it is not sufficient to merely perform perspective transformation processing which has been conventionally performed on a normal image (a two-dimensional image), and it is necessary to perform transformation processing suitable for a stereoscopic image on a displacement map.

In this embodiment, the displacement map correction section 165 performs, on the displacement map, correction processing different from perspective transformation processing performed on the first viewpoint image 11. That is, this correction processing includes coordinate moving processing, which is common to that in perspective transformation processing and transformation processing for displacement amount, which is different from enlargement and reduction of an image in perspective transformation processing.

Figure 7:
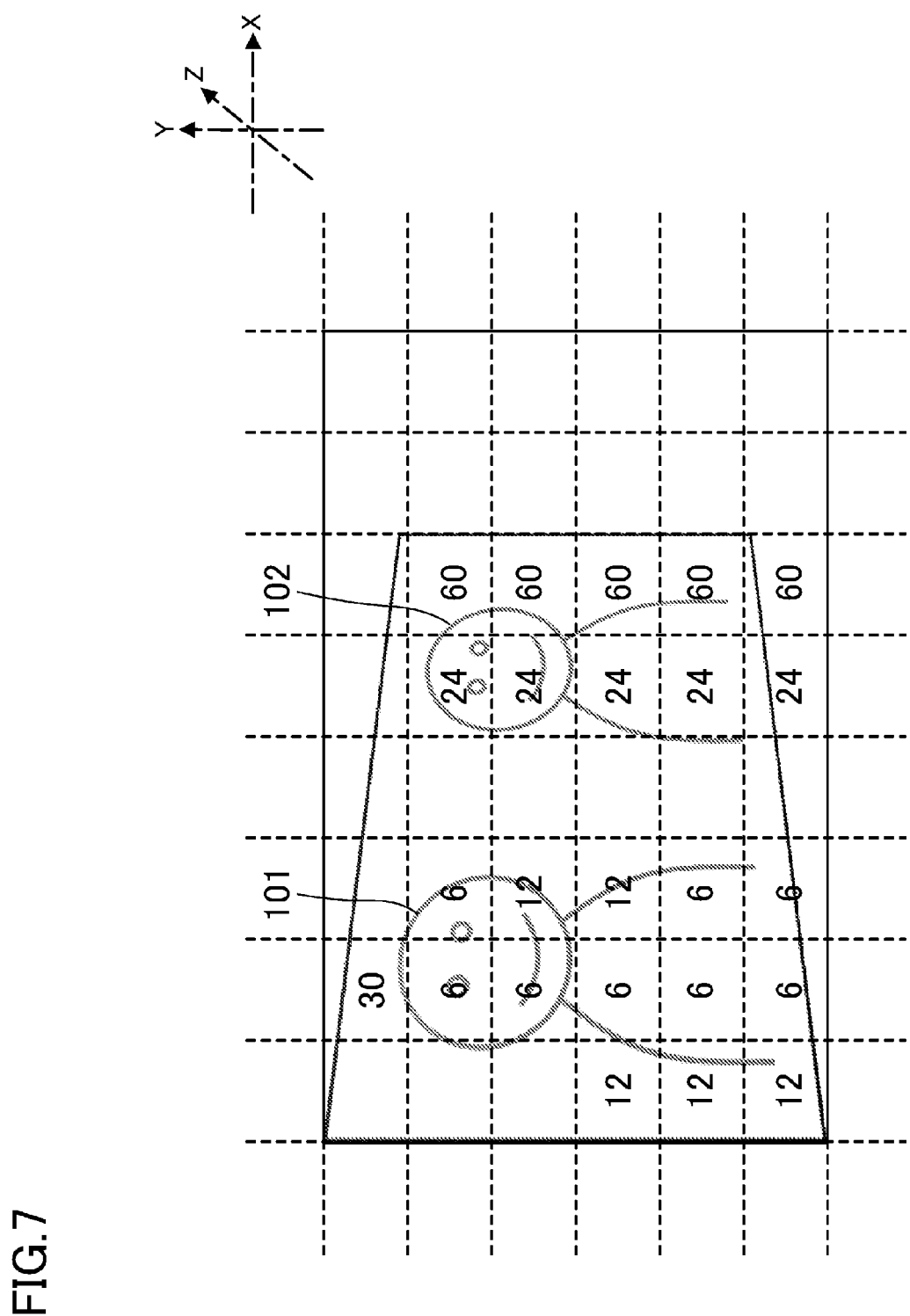
FIG. 7 is a view illustrating an example where correction processing is performed on the displacement map of FIG. 3.

FIG. 7 is a view illustrating an example of a corrected displacement map obtained by correcting the displacement map of FIG. 3. In the corrected displacement map of FIG. 7, coordinate moving processing, which is common to that in perspective transformation processing on the first viewpoint image, is performed. In addition to this, for the displacement amount in each area, transformation processing, which is different from enlargement and reduction of an image in perspective transformation processing on the first viewpoint image, is performed. Specifically, on the basis of a virtual rotation axis used at the perspective transformation processing and a rotation angle thereof, the displacement amount of an area located in the near side is reduced, and the displacement amount of an area located in the distant side is increased. In other words, the displacement amount of an area located in one side of the virtual rotation axis in perspective transformation processing on the first viewpoint image is corrected to be a value indicating a nearer position in the depth direction, and the displacement amount of an area located on the other side of the virtual rotation axis is corrected to be a value indicating a more distant position in the depth direction. As a result of the foregoing transformation processing, the subject 101 on the left side chiefly represents a displacement amount of 6, and the subject 102 on the right side chiefly represents a displacement amount of 24. By this correction, the information regarding the depth direction is no longer contradictory between the new first viewpoint image and the displacement map.

Note that an example in which the displacement map correction section 165 corrects the displacement amount in the horizontal direction is herein described, but the present disclosure is not limited thereto. That is, the displacement amount may be corrected in the direction perpendicular to the virtual rotation axis used in perspective transformation processing.

As has been described, coordinate moving processing, which is common to that in perspective transformation processing on the first viewpoint image, is performed on the displacement map, and transformation processing on the basis of the perspective transformation processing is performed on the displacement amount of each area, thus enabling the generation of information for a correct displacement amount in a stereoscopic image after perspective transformation processing.

Note that either one of the coordinate moving processing and the transformation processing for displacement amount in this case may be executed first. That is, coordinate moving processing, which is common to that in perspective transformation processing on the first viewpoint image, may be performed, and then, transformation processing may be performed on the displacement amount of each area. Alternatively, transformation processing for the displacement amount may be first performed, and then, coordinate moving processing may be performed.

1-2-4. Generation of New Second Viewpoint Image

Figure 8:
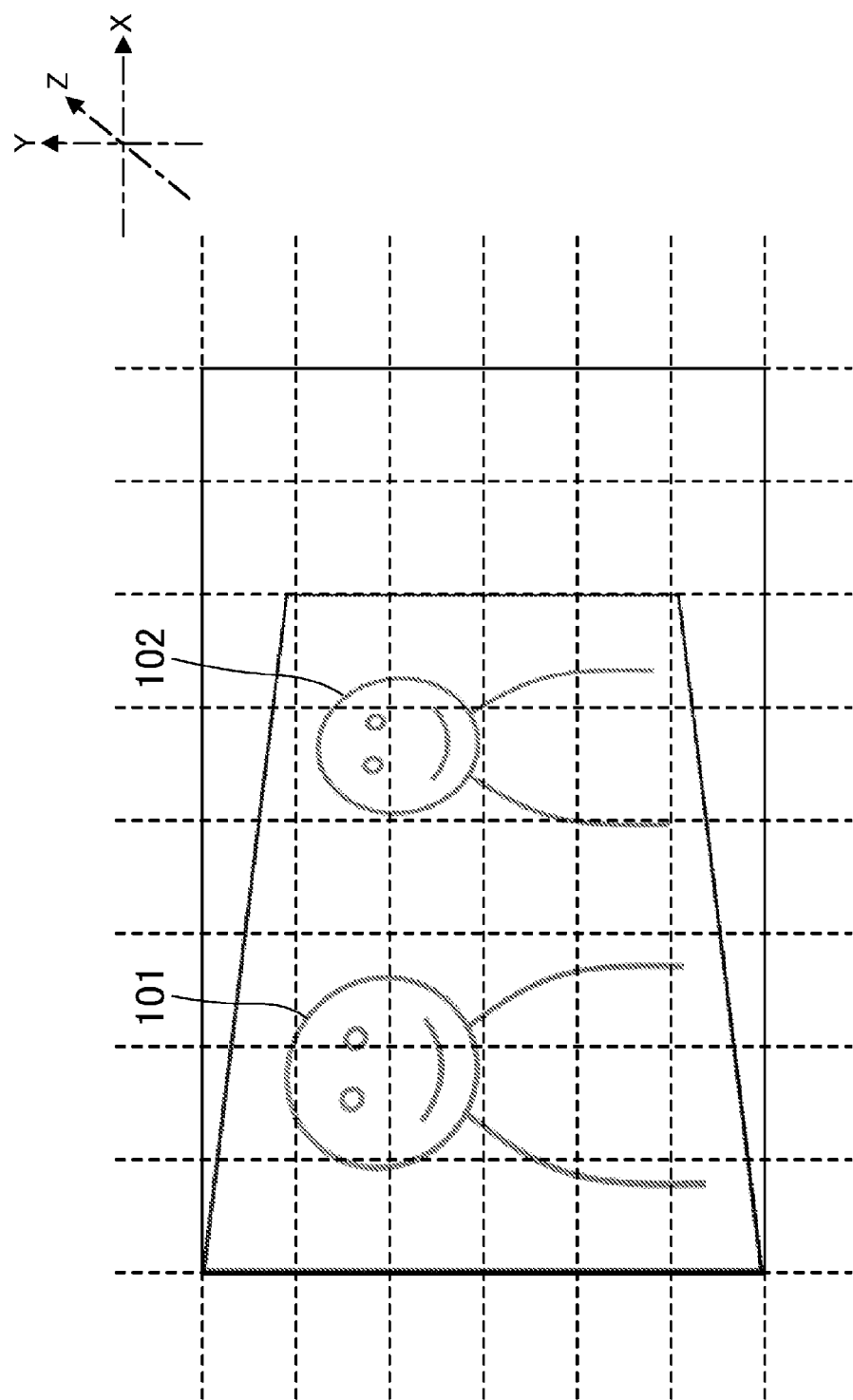
FIG. 8 is a view illustrating an example in which a new second viewpoint image is generated using a corrected displacement map from a new first viewpoint image.

The second new image generation section 166 generates a new second viewpoint image from the new first viewpoint image generated in the first new image generation section 164 on the basis of the corrected displacement map which has undergone correction processing in the displacement map correction section 165. FIG. 8 is a view illustrating an example of a new second viewpoint image generated by the second new image generation section 166. The second new image generation section 166 generates the new second viewpoint image by displacing the new first viewpoint image in accordance with the displacement amount per block in the corrected displacement map.

Figure 9:
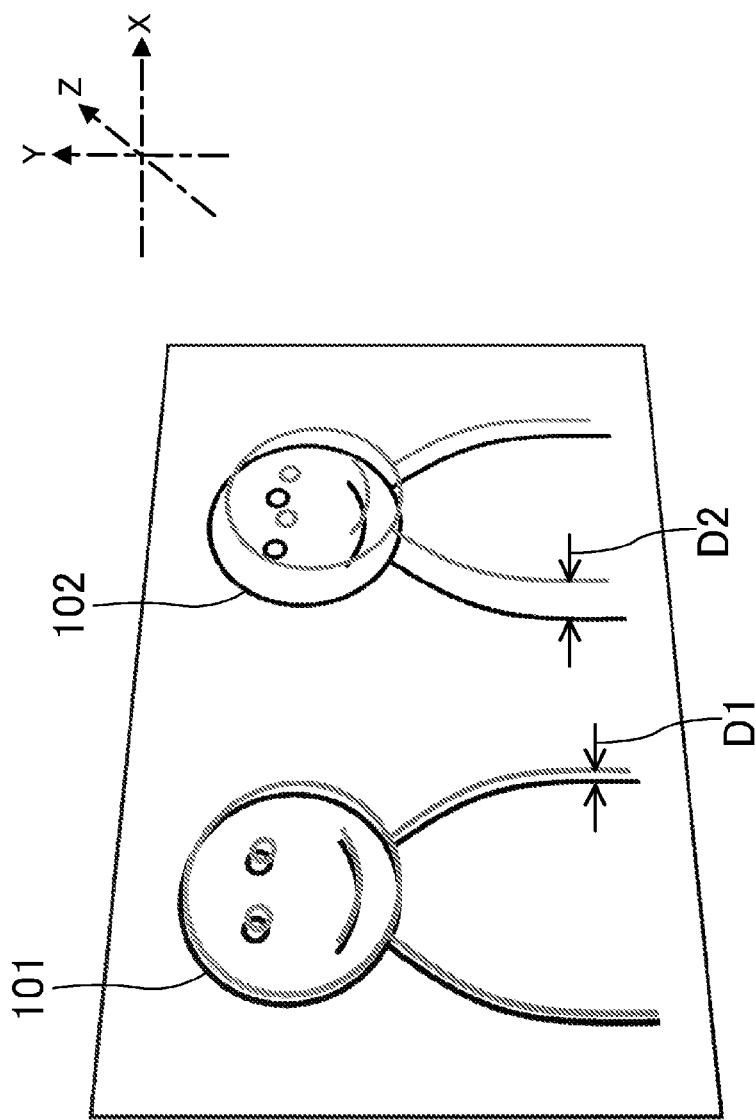
FIG. 9 is a view illustrating a stereoscopic image made of a new first viewpoint image and a new second viewpoint image that are superimposed.
Figure 10:
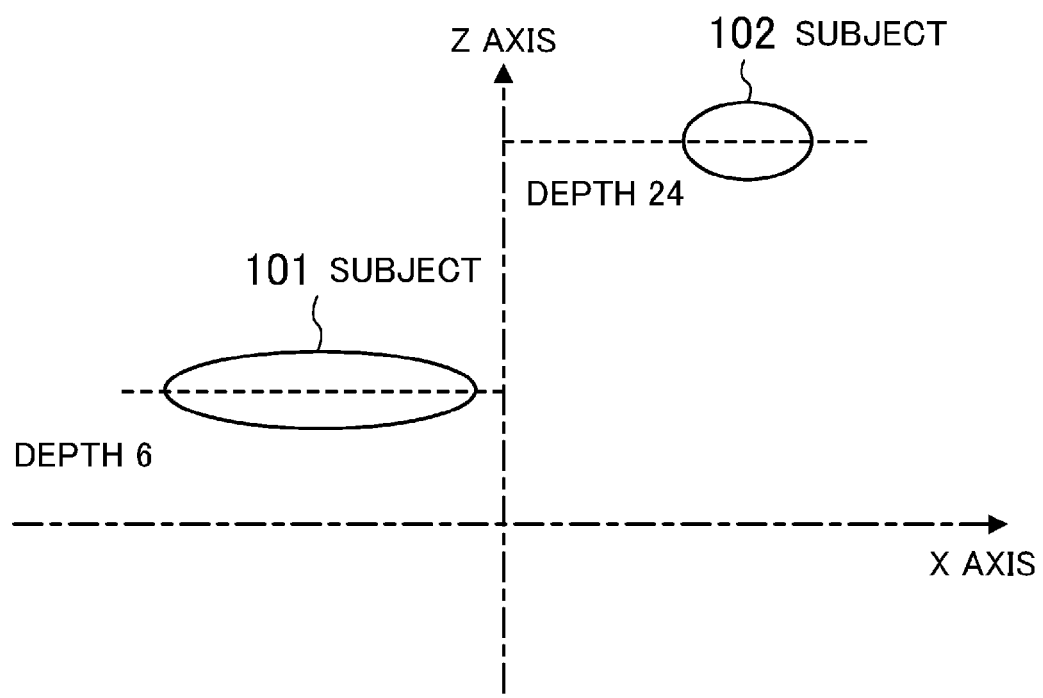
FIG. 10 is a view illustrating a depth relationship in the stereoscopic image of FIG. 9.

FIG. 9 is a view illustrating the case where the new first viewpoint image and the new second viewpoint image which have undergone perspective transformation processing are superimposed. FIG. 10 is a view illustrating the relative positional relationship of the subjects 101 and 102 in FIG. 9. As illustrated in FIG. 10, the subject 101 has a depth of 6, and the subject 102 has a depth of 24, and thus, the subject 101 is disposed nearer than the subject 102. As illustrated in FIG. 9, the displacement amount D1 of the subject 101 disposed in the relatively near side is smaller than the displacement amount D2 of the subject 102 disposed in the relatively distant side. That is, consistency is maintained between the first new viewpoint image and the new second viewpoint image in terms of displacement between subjects. Thus, even when perspective transformation processing is performed on a stereoscopic image, a natural stereoscopic effect can be normally kept for an image which has undergone transformation processing.

1-2-5. Flow of Rotation Processing Performed on Stereoscopic Image

Figure 11:
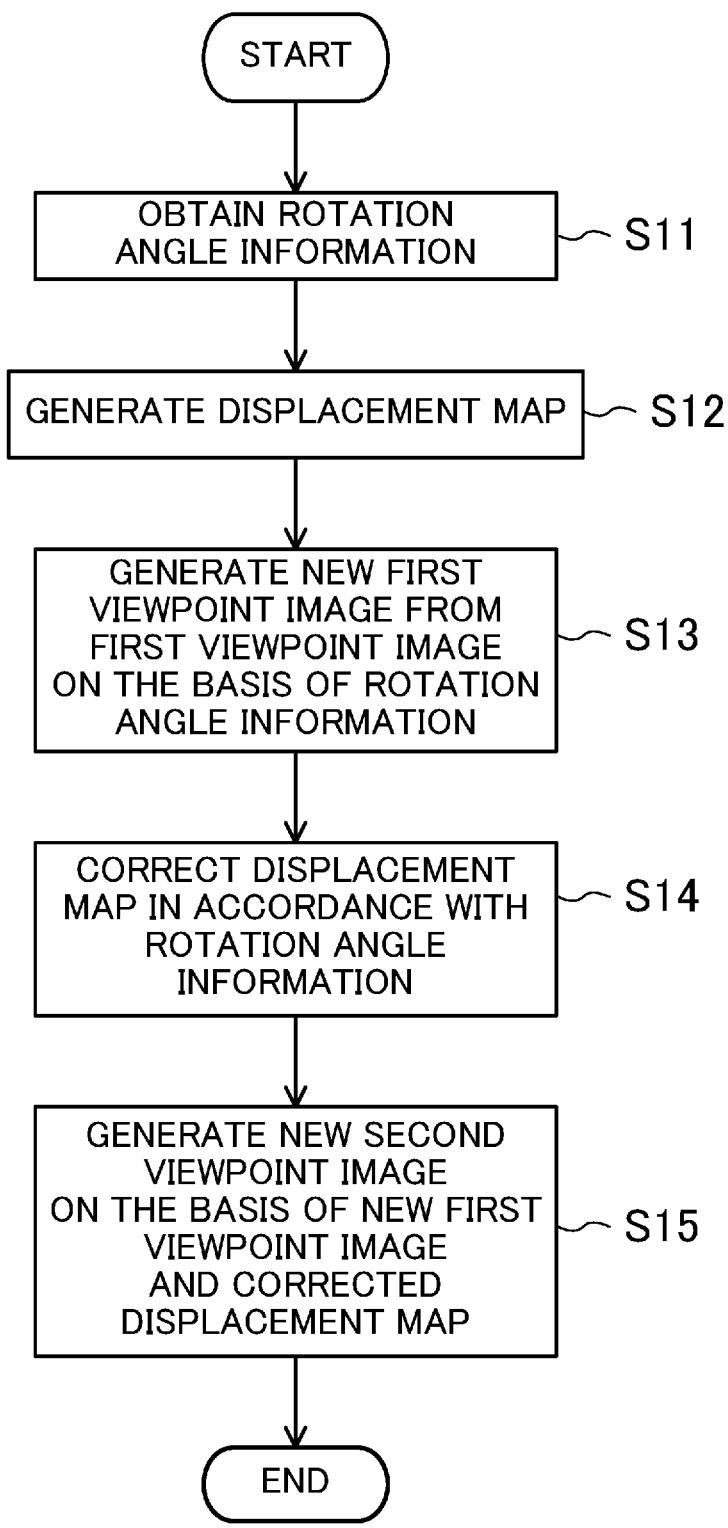
FIG. 11 is a flowchart illustrating a method for performing rotation processing on a stereoscopic image according to an embodiment.

FIG. 11 illustrates a process flow used when the video image processing section 160 performs rotation processing on a stereoscopic image.

(S11) First, the video image processing section 160 obtains rotation angle information output by the controller 210. If the video image processing section 160 does not obtain rotation angel image, the flow will end then.

(S12) Next, the video image processing section 160 generates a displacement map using the method described in Section 1-2-1.

(S13) Next, the video image processing section 160 performs perspective transformation processing on the first viewpoint image on the basis of the rotation angle information output by the controller 210 to generate a new first viewpoint image.

(S14) The video image processing section 160 corrects the displacement map on the basis of the rotation angle information output by the controller 210.

(S15) The video image processing section 160 generates, on the basis of the new first viewpoint image that has undergone perspective transformation processing and the corrected displacement map, a new second viewpoint image, which makes a pair with the new first viewpoint image that has undergone perspective transformation processing. In this case, the video image processing section 160 generates the new second viewpoint image such that, when a viewer views the new first viewpoint image and the new second viewpoint image as a stereoscopic image, the relative positional relationship between subjects indicated by the corrected displacement map is stored. Note that a method for generating the new second viewpoint image may be a known method for generating an image that makes a pair with a single image from the corrected displacement map. Specifically, the method may be realized by a 2D-3D conversion technology.

Note that the operation of S11 may be executed at any timing as long as it is executed before the operation of S13 is executed. Also, the operation of S13 and the operation of S14 may be interchanged. That is, the corrected displacement map and the new first viewpoint image are generated before the processing of generating the new second viewpoint image.

The video image processing section 160 outputs a stereoscopic image made of the new first viewpoint image and the new second viewpoint image to the liquid crystal monitor 270 via the controller 210. Note that the video image processing section 160 may output a stereoscopic image made of the new first viewpoint image and the new second viewpoint image to the memory card 240 via the controller 210 and the card slot 230.

1-3. Advantages, etc.

As described above, in this embodiment, the digital camera 1 includes the displacement map generation section 162, the first new image generation section 164, the displacement map correction section 165, and the second new image generation section 166. The displacement map generation section 162 compares first and second viewpoint images of a stereoscopic image with each other, and generates a displacement map indicating a displacement of the second viewpoint image relative to the first viewpoint image. The first new image generation section 164 performs rotation processing on the first viewpoint image with the rotation axis centered in accordance with a given rotation angle to generate a new first viewpoint image. The displacement map correction section 165 performs correction processing on the displacement map on the basis of a virtual rotation axis and the rotation angle to generate a corrected displacement map. The second new image generation section 166 generates a new second viewpoint image from the new first viewpoint image on the basis of the corrected displacement map.

Thus, the new second viewpoint image that makes a pair as a stereoscopic image with the new first viewpoint image is generated from the new first viewpoint image which has undergone rotation processing, on the basis of the corrected displacement map which has been corrected on the basis of rotation processing. Thus, the generated stereoscopic image made of the new first viewpoint image and the new second viewpoint image has a more natural stereoscopic effect.

Other Embodiments

As an example of the technology according to the present disclosure, the first embodiment has been described above. However, the technology according to the present disclosure is not limited to the first embodiment described above and is also applicable to embodiments realized by modification, replacement, addition, or omission as appropriate.

For example, in the above-described embodiment, the rotation processing using the Y axis as the virtual rotation axis has been described. However, the rotation processing is not limited thereto but may be performed, for example, using the X axis, that is, an axis extending in the horizontal direction, as the virtual rotation axis, and alternatively, may be performed using an axis that obliquely extends as the virtual rotation axis. That is, as long as the rotation processing is performed such that rotation about the virtual rotation axis extending in parallel to the image plane is achieved, a similar processing to that described above can be realized.

Also, the virtual rotation axis may be located at an edge of a screen, and alternatively, may be located outside of the screen. If the virtual rotation axis is located at the edge portion of the image plane or outside the image plane, transformation processing for the displacement amount executed when correction of the displacement map is performed may be performed such that the displacement amount of the entire image or at least a part of the image is corrected to a value indicating a nearer position in the depth direction. As another option, the displacement amount of the entire image or at least a part of the image may be corrected to be a value indicating a more distant position in the depth direction.

If the given rotation angle is a minute value, that is, for example, substantially zero, the processing of generating a new image performed in each of the first new image generation section 164 and the second new image generation section 166 may be stopped. Thus, the new first viewpoint image and the new second viewpoint image are generated only when the stereoscopic effect might be degraded by rotation processing, so that power consumption can be reduced.

In the digital camera 1 described in the embodiment above, each block may be individually formed as a single chip using a semiconductor device, such as an LSI, and alternatively, a part or all of the blocks may be integrated into a single chip. The three-dimensional processing device according to the present disclosure is not limited to a digital camera as used in the description, but may be, for example, a broadcasting camera, a recorder or player which performs recording or playback of a three-dimensional video image, a television device, a photo frame, a mobile information terminal, or like display device.

Note that, although the integrated circuit is herein referred to as an LSI, it may be referred to as an IC, a system LSI, a super LSI, or an ultra LSI, depending on the degree of integration.

Also, a method for forming an integrated circuit is not limited to LSIs, and may be realized using a dedicated circuit or a general-purpose processor. Integrated circuits may be formed using a field programmable gate array (FPGA) which allows programming after LSI fabrication, or a reconfigurable processor which allows reconfiguration of connection and setting of circuit cells in an LSI.

Furthermore, when a new technology for forming an integrated circuit that replaces LSIs is available as a result of the progress in semiconductor technology or another technology derived from semiconductor technology, the functional blocks may be integrated using such a new technology. The adoption of biotechnology, etc. is possible.

Each process of the above-described embodiment may be realized by a hardware, and alternatively, may be realized as a computer program by a software. The computer program can be recorded, for example, in a computer-readable recording medium and be distributed. Furthermore, each process of the above-described embodiment may be realized by mixed processing of software and hardware. Note that it is needless to say that, when the digital camera 1 according to the above-described embodiment is realized by a hardware, timing adjustment for performing each process is needed. In the above-described embodiment, for convenience, the details of timing adjustment for various types of signals generated in an actual hardware design are omitted.

The order of the processes executed in the method according to the above-described embodiment is not necessarily limited to that in the description of the above-described embodiment, but the order of the processes may be changed within a range not departing from the spirit of the present invention.

Embodiments have been described above as illustrative examples of the technology in the present disclosure. For that, the attached and the detailed description are provided.

Therefore, the components described in the attached drawings and the detailed description may include not only a component essential for solving the problems but also components non-essential for solving the problems, in order to illustrate the technology described above. Thus, the non-essential components should not immediately recognized as being essential because the non-essential components are described in the attached drawings and the detailed description.

The above-described embodiments are intended to illustrate examples of the technology of the present disclosure. Therefore, various modifications, replacement, addition, and deletions, etc. may be applied to the components within the scope of claims or within the equivalent scope.

The present disclosure is applicable to a three-dimensional video image processing device that performs rotation processing of a stereoscopic image with a natural stereoscopic effect. Specifically, the present disclosure may be applied to a digital camera and a broadcasting camera used for shooting a three-dimensional video image, a recorder or a player that performs recording or playback of a three-dimensional video image, a television device, a photo frame, a mobile information terminal, or like display device.

What is claimed is:

1. A three-dimensional video image processing device that performs processing of rotating a stereoscopic image about a virtual rotation axis extending in parallel to an image plane, the device comprising:

a displacement map generation section that compares a first viewpoint image and a second viewpoint image of the stereoscopic image with each other to generate a displacement map indicating a displacement of the second viewpoint image relative to the first viewpoint image;

a first new image generation section that performs rotation processing on the first viewpoint image about the virtual rotation axis in accordance with a given rotation angle to generate a new first viewpoint image;

a displacement map correction section that performs correction processing on the displacement map on the basis of the virtual rotation axis and the rotation angle to generate a corrected displacement map; and a second new image generation section that generates a new second viewpoint image from the new first viewpoint image on the basis of the corrected displacement map.

2. The three-dimensional video image processing device of claim 1, wherein the correction processing includes coordinate moving processing, which is common to coordinate moving processing in the rotation processing and transformation processing for displacement amount, which is different from enlargement and reduction of an image in the rotation processing.

3. The three-dimensional video image processing device of claim 2, wherein in the transformation processing, the displacement map correction section corrects a displacement amount of an area located at one side of the virtual rotation axis used in the rotation processing to be a value indicating a nearer position in a depth direction and corrects a displacement amount of an area located at the other side of the virtual rotation axis to be a value indicating a more distant position in the depth direction.

4. The three-dimensional video image processing device of claim 2, wherein when the virtual rotation axis used in the rotation processing is located at an edge portion of the image plane or outside the image plane, the displacement map correction section corrects, in the transformation processing, each of displacement amounts of all or a part of areas to be a value indicating a nearer position in a depth direction or each of displacement amounts of all or a part of areas to be a value indicating a more distant position in the depth direction.

5. The three-dimensional video image processing device of claim 1, wherein the second new image generation section generates the new second viewpoint image by displacing the new first viewpoint image on the basis of the corrected displacement map.

6. The three-dimensional video image processing device of claim 5, wherein the second new image generation section generates the new second viewpoint image such that a relative positional relationship between subjects in a stereoscopic image made of the new first viewpoint image and the new second viewpoint image matches a relative positional relationship determined on the basis of the corrected displacement map.

7. The three-dimensional video image processing device of claim 1, wherein when the rotation angle is a minute value, the processing performed in the first new image generation section and the processing performed in the second new image generation section are stopped.

8. A three-dimensional video image processing method in which processing of rotating a stereoscopic image about a virtual rotation axis extending in parallel to an image plane is performed, the method comprising:

comparing a first viewpoint image and a second viewpoint image of the stereoscopic image with each other to generate a displacement map indicating a displacement of the second viewpoint image relative to the first viewpoint image;

performing rotation processing on the first viewpoint image about the virtual rotation axis in accordance with a given rotation angle to generate a new first viewpoint image;

performing correction processing on the displacement map on the basis of the virtual rotation axis and the rotation angle to generate a corrected displacement map; and generating a new second viewpoint image from the new first viewpoint image on the basis of the corrected displacement map.

9. A non-transitory computer-readable recording medium that records a program causes a computer to execute a three-dimensional video image processing method in which processing of rotating a stereoscopic image about a virtual rotation axis extending in parallel to an image plane is performed, the program causing the computer to execute:

comparing a first viewpoint image and a second viewpoint image of the stereoscopic image with each other to generate a displacement map indicating a displacement of the second viewpoint image relative to the first viewpoint image;

performing rotation processing on the first viewpoint image about the virtual rotation axis in accordance with a given rotation angle to generate a new first viewpoint image;

performing correction processing on the displacement map on the basis of the virtual rotation axis and the rotation angle to generate a corrected displacement map; and generating a new second viewpoint image from the new first viewpoint image on the basis of the corrected displacement map.

* * * * *